United States Patent
Loman et al.

(10) Patent No.: US 9,226,145 B1
(45) Date of Patent: Dec. 29, 2015

(54) VERIFICATION OF MOBILE DEVICE INTEGRITY DURING ACTIVATION

(71) Applicant: Sprint Communications Company L.P., Overland Park, KS (US)

(72) Inventors: Clint H. Loman, Raymore, MO (US); Lyle W. Paczkowski, Mission Hills, KS (US); Robert L. Spanel, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 38 days.

(21) Appl. No.: 14/229,532

(22) Filed: Mar. 28, 2014

(51) Int. Cl.
*H04W 12/04* (2009.01)

(52) U.S. Cl.
CPC ................................. *H04W 12/04* (2013.01)

(58) Field of Classification Search
CPC ..... H04W 12/12; H04W 12/06; H04W 88/02; H04W 12/08; H04W 12/02; H04W 63/08
See application file for complete search history.

(56) References Cited

U.S. PATENT DOCUMENTS

| | | | |
|---|---|---|---|
| 5,303,378 A | 4/1994 | Cohen | |
| 5,321,735 A | 6/1994 | Breeden et al. | |
| 5,764,889 A | 6/1998 | Ault et al. | |
| 5,796,952 A | 8/1998 | Davis et al. | |
| 6,131,024 A | 10/2000 | Boltz | |
| 6,177,860 B1 | 1/2001 | Cromer et al. | |
| 6,219,712 B1 | 4/2001 | Mann et al. | |
| 6,363,150 B1 | 3/2002 | Bhagavath et al. | |
| 6,477,180 B1 | 11/2002 | Aggarwal et al. | |
| 6,507,904 B1 | 1/2003 | Ellison et al. | |
| 6,614,893 B1 | 9/2003 | Paiz | |
| 6,668,322 B1 | 12/2003 | Wood et al. | |
| 6,691,230 B1 | 2/2004 | Bardon | |
| 6,754,784 B1 | 6/2004 | North et al. | |

(Continued)

FOREIGN PATENT DOCUMENTS

| | | |
|---|---|---|
| WO | WO2011025433 A1 | 3/2011 |
| WO | WO2012064171 A1 | 5/2012 |

(Continued)

OTHER PUBLICATIONS

FAIPP Pre-Interview Communication dated Mar. 25, 2015, U.S. Appl. No. 13/532,588, filed Jun. 25, 2012.

(Continued)

*Primary Examiner* — Kashif Siddiqui

(57) ABSTRACT

A mobile communication device. The mobile communication device comprises a verification application, when executed by a trusted security zone portion of the processor, examines an integrity of a preloaded open mobile alliance (OMA) device management (DM) payload, wherein a security key in the OMA DM payload is compared with a security key stored in the trusted security zone to determine the integrity of the OMA DM payload and to determine the state of a preloaded first operating system from a first network. The verification application further verifies the identification of the mobile communication device, transmits information comprising the security key in the trusted security zone to a server to verify network provisioning of the mobile communication device, and changes the toggle key based on the verification results, whereby asset migration between network carriers is achieved and unauthorized activities are avoided while security keys are kept confidential to individual carriers.

20 Claims, 7 Drawing Sheets

(56) References Cited

U.S. PATENT DOCUMENTS

| | | |
|---|---|---|
| 6,823,454 B1 | 11/2004 | Hind et al. |
| 6,824,064 B2 | 11/2004 | Guthery et al. |
| 6,895,234 B1 | 5/2005 | Laursen et al. |
| 7,043,241 B1 * | 5/2006 | Sladek et al. ............... 455/432.3 |
| 7,366,806 B2 | 4/2008 | Milenkovic et al. |
| 7,387,240 B2 | 6/2008 | Ziegler |
| 7,519,824 B1 | 4/2009 | Peyravian et al. |
| 7,552,467 B2 | 6/2009 | Lindsay |
| 7,571,364 B2 | 8/2009 | Whetsel |
| 7,650,645 B1 | 1/2010 | Langendorf et al. |
| 7,716,720 B1 | 5/2010 | Marek et al. |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,112,794 B2 | 2/2012 | Little et al. |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,271,336 B2 | 9/2012 | Mikurak |
| 8,316,237 B1 | 11/2012 | Felsher et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,504,097 B1 | 8/2013 | Cope et al. |
| 8,588,749 B1 | 11/2013 | Sadhvani et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,667,607 B2 | 3/2014 | Paczkowski et al. |
| 8,707,056 B2 | 4/2014 | Felton |
| 8,712,407 B1 | 4/2014 | Cope et al. |
| 8,718,554 B2 | 5/2014 | Abel |
| 8,719,586 B1 | 5/2014 | Paleja et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,875 B2 | 8/2014 | Garcia Martin et al. |
| 8,811,971 B2 | 8/2014 | Corda et al. |
| 8,831,998 B1 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,881,977 B1 | 11/2014 | Paczkowski et al. |
| 8,886,925 B2 | 11/2014 | Qureshi et al. |
| 8,954,588 B1 | 2/2015 | Bertz et al. |
| 8,984,592 B1 | 3/2015 | Paczkowski et al. |
| 8,989,705 B1 | 3/2015 | Katzer et al. |
| 9,015,068 B1 | 4/2015 | Bertz et al. |
| 9,021,585 B1 | 4/2015 | Paczkowski et al. |
| 9,027,102 B2 | 5/2015 | Katzer et al. |
| 9,049,013 B2 | 6/2015 | Paczkowski et al. |
| 9,049,186 B1 | 6/2015 | Paczkowski et al. |
| 9,066,230 B1 | 6/2015 | Paczkowski et al. |
| 9,069,952 B1 | 6/2015 | Paczkowski et al. |
| 9,104,840 B1 | 8/2015 | Paczkowski et al. |
| 9,118,655 B1 | 8/2015 | Paczkowski et al. |
| 2001/0041591 A1 * | 11/2001 | Carroll ......................... 455/557 |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0156911 A1 | 10/2002 | Croman et al. |
| 2002/0166070 A1 | 11/2002 | Mualem et al. |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0045273 A1 | 3/2003 | Pyhalammi et al. |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0216143 A1 | 11/2003 | Roese et al. |
| 2003/0229514 A2 | 12/2003 | Brown |
| 2003/0237002 A1 | 12/2003 | Oishi et al. |
| 2004/0158840 A1 | 8/2004 | Rothman et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2005/0015601 A1 | 1/2005 | Tabi |
| 2005/0045719 A1 | 3/2005 | Yang |
| 2005/0052994 A1 | 3/2005 | Lee |
| 2005/0091505 A1 | 4/2005 | Riley et al. |
| 2005/0123596 A1 | 6/2005 | Kohane et al. |
| 2005/0125396 A1 | 6/2005 | Liu |
| 2005/0138433 A1 | 6/2005 | Linetsky |
| 2005/0181796 A1 | 8/2005 | Kumar et al. |
| 2005/0228892 A1 | 10/2005 | Riley et al. |
| 2005/0235166 A1 | 10/2005 | England et al. |
| 2005/0239481 A1 | 10/2005 | Seligmann |
| 2005/0272445 A1 | 12/2005 | Zellner |
| 2005/0289355 A1 | 12/2005 | Kitariev et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0129488 A1 | 6/2006 | Vincent |
| 2006/0156026 A1 | 7/2006 | Utin |
| 2006/0164978 A1 | 7/2006 | Werner et al. |
| 2006/0171537 A1 * | 8/2006 | Enright ........................ 380/270 |
| 2006/0190605 A1 | 8/2006 | Franz et al. |
| 2006/0212853 A1 | 9/2006 | Sutardja |
| 2006/0224901 A1 | 10/2006 | Lowe |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0118880 A1 | 5/2007 | Mauro, II |
| 2007/0143210 A1 | 6/2007 | Yeung et al. |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2008/0005794 A1 | 1/2008 | Inoue et al. |
| 2008/0014867 A1 | 1/2008 | Finn |
| 2008/0020745 A1 | 1/2008 | Bae et al. |
| 2008/0022374 A1 | 1/2008 | Brown et al. |
| 2008/0051142 A1 | 2/2008 | Calvet et al. |
| 2008/0092213 A1 | 4/2008 | Wei et al. |
| 2008/0097793 A1 | 4/2008 | Dicks et al. |
| 2008/0108321 A1 * | 5/2008 | Taaghol et al. ............... 455/410 |
| 2008/0109662 A1 | 5/2008 | Natarajan et al. |
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0162361 A1 | 7/2008 | Sklovsky |

(56) References Cited

U.S. PATENT DOCUMENTS

| | | |
|---|---|---|
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |
| 2008/0244758 A1 | 10/2008 | Sahita et al. |
| 2009/0047923 A1 | 2/2009 | Jain et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0227290 A1 | 9/2009 | Chien |
| 2009/0248445 A1 | 10/2009 | Harnick |
| 2009/0271321 A1 | 10/2009 | Stafford |
| 2009/0281947 A1 | 11/2009 | Erel |
| 2009/0300599 A1 | 12/2009 | Piotrowski |
| 2009/0312011 A1 | 12/2009 | Huomo et al. |
| 2009/0320028 A1 | 12/2009 | Gellerich et al. |
| 2010/0031325 A1 | 2/2010 | Maigne et al. |
| 2010/0052844 A1 | 3/2010 | Wesby |
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0125904 A1 | 5/2010 | Nice et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0082711 A1 | 4/2011 | Poeze et al. |
| 2011/0107426 A1 | 5/2011 | Yen et al. |
| 2011/0112968 A1 | 5/2011 | Florek et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145926 A1 | 6/2011 | Dalcher et al. |
| 2011/0154032 A1 | 6/2011 | Mauro, II |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208797 A1 | 8/2011 | Kim |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258462 A1 | 10/2011 | Robertson et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |

(56) References Cited

U.S. PATENT DOCUMENTS

| | | |
|---|---|---|
| 2013/0014259 A1 | 1/2013 | Gribble et al. |
| 2013/0019323 A1 | 1/2013 | Arvidsson et al. |
| 2013/0031374 A1 | 1/2013 | Thom et al. |
| 2013/0034081 A1 | 2/2013 | Ban et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0074067 A1 | 3/2013 | Chowdhry |
| 2013/0086385 A1 | 4/2013 | Poeluev |
| 2013/0086684 A1 | 4/2013 | Mohler |
| 2013/0097302 A9 | 4/2013 | Khedouri et al. |
| 2013/0097657 A1 | 4/2013 | Cardamore et al. |
| 2013/0105565 A1 | 5/2013 | Kamprath |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1 | 5/2013 | Ferguson et al. |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159021 A1 | 6/2013 | Felsher |
| 2013/0159186 A1 | 6/2013 | Burdnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |
| 2013/0262264 A1 | 10/2013 | Karstoft |
| 2013/0263212 A1 | 10/2013 | Faltyn et al. |
| 2013/0290709 A1 | 10/2013 | Muppidi et al. |
| 2013/0305333 A1 | 11/2013 | Katzer et al. |
| 2013/0310003 A1 | 11/2013 | Sadhvani et al. |
| 2013/0332456 A1 | 12/2013 | Arkin |
| 2013/0343181 A1 | 12/2013 | Stroud et al. |
| 2013/0345530 A1 | 12/2013 | McRoberts et al. |
| 2013/0347064 A1 | 12/2013 | Aissi |
| 2013/0347103 A1 | 12/2013 | Veteikis et al. |
| 2014/0007182 A1 | 1/2014 | Qureshi et al. |
| 2014/0007222 A1 | 1/2014 | Qureshi et al. |
| 2014/0047548 A1 | 2/2014 | Bye et al. |
| 2014/0059642 A1 | 2/2014 | Deasy et al. |
| 2014/0074508 A1 | 3/2014 | Ying et al. |
| 2014/0089243 A1 | 3/2014 | Oppenheimer |
| 2014/0089699 A1 | 3/2014 | O'Connor et al. |
| 2014/0104287 A1 | 4/2014 | Nalluri et al. |
| 2014/0106709 A1 | 4/2014 | Palamara et al. |
| 2014/0141718 A1 | 5/2014 | Stromberg et al. |
| 2014/0155025 A1 | 6/2014 | Parker et al. |
| 2014/0173747 A1 | 6/2014 | Govindaraju |
| 2014/0188738 A1 | 7/2014 | Huxham |
| 2014/0215196 A1 | 7/2014 | Berlin |
| 2014/0245444 A1 | 8/2014 | Lutas et al. |
| 2014/0254381 A1 | 9/2014 | Racz et al. |
| 2014/0267332 A1 | 9/2014 | Chhabra et al. |
| 2014/0279558 A1 | 9/2014 | Kadi et al. |
| 2014/0281544 A1 | 9/2014 | Paczkowski et al. |
| 2014/0298026 A1 | 10/2014 | Isozaki et al. |
| 2015/0106805 A1 | 4/2015 | Melander et al. |
| 2015/0169885 A1 | 6/2015 | Paczkowski et al. |
| 2015/0172928 A1 | 6/2015 | Katzer et al. |

FOREIGN PATENT DOCUMENTS

| | | |
|---|---|---|
| WO | 2013170228 A2 | 11/2013 |
| WO | 2014004590 A2 | 1/2014 |
| WO | 2014018575 A2 | 1/2014 |
| WO | 2014025687 A2 | 2/2014 |
| WO | WO2014158431 A1 | 10/2014 |

OTHER PUBLICATIONS

FAIPP Pre-Interview Communication dated Mar. 10, 2015, U.S. Appl. No. 13/762,319, filed Feb. 7, 2013.
FAIPP Pre-Interview Communication dated May 21, 2015, U.S. Appl. No. 14/090,667, filed Nov. 26, 2013.
Final Office Action dated Apr. 7, 2015, U.S. Appl. No. 13/844,145, filed Mar. 15, 2013.
First Action Interview Office Action dated Apr. 7, 2015, U.S. Appl. No. 13/802,404, filed Mar. 13, 2013.
FAIPP Pre-Interview Communication dated Mar. 26, 2015, U.S. Appl. No. 13/939,175, filed Jul. 10, 2013.
Final Office Action dated Mar. 24, 2015, U.S. Appl. No. 13/844,282, filed Mar. 15, 2013.
FAIPP Pre-Interview Communication dated Mar. 24, 2015, U.S. Appl. No. 13/964,112, filed Aug. 12, 2013.
FAIPP Pre-Interview Communication dated Apr. 15, 2015, U.S. Appl. No. 14/085,474, filed Nov. 20, 2013.
First Action Interview Office Action dated Apr. 10, 2015, U.S. Appl. No. 14/075,663, filed Nov. 8, 2013.
Notice of Allowance dated Apr. 9, 2015, U.S. Appl. No. 14/163,047, filed Jan. 24, 2014.
Faipp Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Bertz, Lyle T., et al., "Framework for Real-Time Brokering of Digital Content Delivery," filed Mar. 17, 2015, U.S. Appl. No. 14/659,614.
Marquard, et al., "Infrastructure for Secure Short Message Transmission," filed Apr. 7, 2015, U.S. Appl. No. 14/681,077.
Paczkowski, Lyle W., et al., "Trusted Code Generation and Verification to Prevent Fraud from Maleficent External Devices that Capture Data," filed Jan. 14, 2015, U.S. Appl. No. 14/596,218.
Notice of Allowance dated May 29, 2015, U.S. Appl. No. 14/085,474, filed Nov. 20, 2013.
Office Action dated Aug. 29, 2014, U.S. Appl. No. 13/470,203, filed May 11, 2012.
Notice of Allowance dated Oct. 8, 2014, U.S. Appl. No. 13/294,177, filed Nov. 11, 2011.
FAIPP Pre-Interview Communication dated Sep. 25, 2014, U.S. Appl. No. 13/533,969, filed Jun. 27, 2012.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Notice of Allowance dated Sep. 19, 2014, U.S. Appl. No. 13/594,778, filed Aug. 25, 2012.
Final Office Action dated Nov. 7, 2014, U.S. Appl. No. 13/786,450, filed Mar. 5, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
FAIPP Pre-Interview Communication dated Oct. 29, 2014, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Foreign Communication from a Related Counterpart—International Preliminary Report on Patentability, dated Nov. 20, 2014, PCT/US13/40673, filed on May 10, 2013.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.

(56) References Cited

OTHER PUBLICATIONS

Lee, Jeremy, et al., "A Low-Cost Solution for Protecting IPs Against Scan-Based Side Channel Attacks," 24th IEEE VLSI Test Symposium. Pub. Date: 2006. http://ieeexplore. ieee. org/stamp/stamp. jsp?tp=&arnumber= 1617569.
Foreign Communication from a Related Counterpart—International Search Report and Written Opinion, dated Jul. 11, 2014, PCT/US14/16651, filed on Feb. 16, 2014.
Cope, Warren B., et al., "Electronic Purchase Transaction Trust Infrastructure", filed May 29, 2012, U.S. Appl. No. 13/482,731.
Katzer, Robin D., et al., "Secure Placement of Centralized Media Controller Application in Mobile Access Terminal", filed Nov. 11, 2011, U.S. Appl. No. 13/294,177.
Paczkowski, Lyle W., et al., "Trusted Policy and Charging Enforcement Function", filed Jun. 27, 2012, U.S. Appl. No. 13/533,969.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Nov. 26, 2013, U.S. Appl. No. 14/090,667.
Katzer, Robin D., et al., "Trusted Access to Third Party Applications Systems and Methods", filed Jul. 25, 2012, U.S. Appl. No. 13/557,213.
Paczkowski, Lyle W., et al., "Trusted Security Zone Access to Peripheral Devices", filed Jan. 6, 2014, U.S. Appl. No. 14/148,714.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Bertz, Lyle T., et al., "Framework for Real-Time Brokering of Digital Content Delivery," filed Aug. 25, 2012, U.S. Appl. No. 13/594,777.
Bertz, Lyle T., et al.,"Reservations in Real-Time Brokering of Digital Content Delivery," filed Aug. 25, 2012, U.S. Appl. No. 13/594,778.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. No. 13/786,450.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Paczkowski, Lyle W., et al., "Trusted Security Zone Containers for the Protection and Confidentiality of Trusted Service Manager Data", filed Feb. 16, 2014, PCT Application No. PCT/US14/16651.
Paczkowski, Lyle W., et al., "Verifying Applications Using a Trusted Security Zone", filed Aug. 12, 2013, U.S. Appl. No. 13/964,112.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Trusted Processing Location Within a Graphics Processing Unit", filed Jul. 10, 2013, U.S. Appl. No. 13/939,175.
McCracken, Billy Gene, Jr., et al. "Mobile Communication Device Profound Identity Brokering Framework", filed Jun. 6, 2013, U.S. Appl. No. 13/912,190.
Urbanek, Robert E., Subscriber Identity Module Virtualization:, filed Nov. 20, 2013, U.S. Appl. No. 14/085,474.
Krieger, Michael D., et al., "Billing Varied Service Based on Tier", filed Nov. 8, 2013, U.S. Appl. No. 14/075,663.
Paczkowski, Lyle W., et al., "Trusted Display and Transmission of Digital Ticket Documentation", filed Jan. 24, 2014, U.S. Appl. No. 14/163,047.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Cordes, Kevin R., et al., "Digest of Biographical Information for an Electronic Device with Static and Dynamic Portions", filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.
FAIPP Pre-Interview Communication dated Mar. 20, 2014, U.S. Appl. No. 13/482,731, filed May 29, 2012.
Notice of Allowance dated May 27, 2014, U.S. Appl. No. 13/482,731, filed May 29, 2012.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
Final Office Action dated Sep. 9, 2013, U.S. Appl. No. 13/440,980, filed Apr. 5, 2012.
Notice of Allowance dated Nov. 29, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
Final Office Action dated Mar. 27, 2014, U.S. Appl. No. 13/470,203, filed May 11, 2012.
Advisory Action dated May 29, 2014, U.S. Appl. No. 13/470,203, filed May 11, 2012.
FAIPP Pre-Interview Communication dated May 12, U.S. Appl. No. 13/294,177, filed Nov. 11, 2011.
FAIPP Pre-Interview Communication dated Jun. 6, 2013, U.S. Appl. No. 13/571,348, filed Aug. 10, 2012.
Office Action dated Sep. 25, 2013, U.S. Appl. No. 13/571,348, filed Aug. 10, 2012.
Final Office Action dated Apr. 10, 2014, U.S. Appl. No. 13/571,348, filed Aug. 10, 2012.
Advisory Action dated Jun. 23, 2014, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.

(56) References Cited

OTHER PUBLICATIONS

Office Action dated Dec. 19, 2013, U.S. Appl. No. 13/557,213, filed Jul. 25, 2012.
Notice of Allowance dated Jun. 4, 2014, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance date Jan. 31, 2014, U.S. Appl. No. 13/610,856, filed Sep. 11, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
Notice of Allowance dated Oct. 16, 2013, U.S. Appl. No. 13/556,200, filed Jul. 24, 2012.
FAIPP Pre-Interview Communication dated Aug. 4, 2014, U.S. Appl. No. 13/844,357, filed Mar. 15, 2013.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Notice of Allowance dated Jul. 8, 2014, U.S. Appl. No. 13/802,383, filed Mar. 13, 2013.
Restriction Requirement dated Aug. 14, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
Office Action dated May 5, 2014, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Notice of Allowance dated Jan. 28, 2014, U.S. Appl. No. 12/486,873, filed Jun. 18, 2009.
Zimmerman, Ann, "Check Out the Future of Shopping", The Wall Street Journal, Business, May 18, 2011, http://online.wsj.com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Search Report and Written Opinion, dated Feb. 4, 2014, PCT/US13/51750, filed on Jul. 24, 2013.
Foreign Communication from a Related Counterpart—International Search Report and Written Opinion, dated Apr. 22, 2014, PCT/US13/53617, filed on Aug. 5, 2013.

Ahmed, Farid, et al., "Correlation-based Watermarking Method for Imagine Authentication Applications", Society of Photo-Optical Instrumentation Engineers, Feb. 17, 2004, pp. 1834-1838.
Notice of Allowance dated Dec. 22, 2014, U.S. Appl. No. 13/470,203, filed May 11, 2012.
Notice of Allowance dated Feb. 5, 2015, U.S. Appl. No. 13/533,969, filed Jun. 27, 2012.
Office Action dated Dec. 15, 2014, U.S. Appl. No. 13/571,348, filed Aug. 10, 2012.
Restriction Requirement dated Jan. 2, 2015, U.S. Appl. No. 13/762,319, filed Feb. 7, 2013.
FAIPP Pre-Interview Communication dated Feb. 12, 2015, U.S. Appl. No. 14/066,661, filed Oct. 29, 2013.
Notice of Allowance dated Dec. 3, 2014, U.S. Appl. No. 13/594,777, filed Aug. 25, 2012.
First Action Interview Office Action dated Dec. 3, 2014, U.S. Appl. No. 13/594,779, filed Aug. 25, 2012.
Notice of Allowance dated Feb. 26, 2015, U.S. Appl. No. 13/786,450, filed Mar. 5, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
Notice of Allowance dated Dec. 19, 2014, U.S. Appl. No. 13/844,325, filed Mar. 15, 2013.
Notice of Allowance dated Jan. 2, 2015, U.S. Appl. No. 13/831,463, filed Mar. 14, 2013.
FAIPP Pre-Interview Communication dated Feb. 4, 2015, U.S. Appl. No. 14/075,663, filed Nov. 8, 2013.
FAIPP Pre-Interview Communication dated Feb. 25, 2015, U.S. Appl. No. 14/163,047, filed Jan. 24, 2014.
Restriction Requirement dated Jan. 5, 2015, U.S. Appl. No. 13/857,139, filed Apr. 4, 2013.
Foreign Communication from a Related Counterpart—International Preliminary Report on Patentability, dated Jan. 8, 2015, PCT/US13/47729, filed on Jun. 25, 2013.
Foreign Communication from a Related Counterpart—International Preliminary Report on Patentability, dated Feb. 19, 2015, PCT/US13/53617, filed on Aug. 5, 2013.
Foreign Communication from a Related Counterpart—International Preliminary Report on Patentability, dated Feb. 5, 2015, PCT/US13/51750, filed on Jul. 24, 2013.
Katzer, Robin D., et al., "Web Server Bypass of Backend Process on Near Field Communications and Secure Elements Chips", filed Feb. 26, 2015, U.S. Appl. No. 14/632,850.
Neson, Tracy L., et al., "Mated Universal Serial Bus (USB) Wireless Dongles Configured with Destination Addresses", filed Jan. 26, 2015, U.S. Appl. No. 14/606,011.
Paczkowski, Lyle W., et al., "Trusted Code Generation and Verification to Prevent Fraud from Maleficent External Devices that Capture Data", filed Jan. 14, 2015, U.S. Appl. No. 14/592,218.
FAIPP Pre-Interview Communication dated Jul. 2, 2015, U.S. Appl. No. 14/632,850, filed Feb. 26, 2015.
Notice of Allowance dated Jun. 17, 2015, U.S. Appl. No. 13/571,348, filed Aug. 10, 2012.
Notice of Allowance dated Jun. 9, 2015, U.S. Appl. No. 13/762,319, filed Feb. 7, 2013.
Notice of Allowance dated Aug. 4, 2015, U.S. Appl. No. 14/090,667, filed Nov. 26, 2013.
Notice of Allowance dated Jul. 6, 2015, U.S. Appl. No. 13/844,145, filed Mar. 15, 2013.
Notice of Allowance dated Jul. 6, 2015, U.S. Appl. No. 14/066,661, filed Oct. 29, 2013.
Notice of Allowance dated Aug. 14, 2015, U.S. Appl. No. 13/594,779, filed Aug. 25, 2012.
Final Office Action dated Aug. 27, 2015, U.S. Appl. No. 13/802,404, filed Mar. 13, 2013.
Notice of Allowance dated Jul. 7, 2015, U.S. Appl. No. 13/939,175, filed Jul. 10, 2013
Advisory Action dated Jun. 10, 2015, U.S. Appl. No. 13/844,282, filed Mar. 15, 2013.

(56) References Cited

OTHER PUBLICATIONS

Office Action dated Aug. 24, 2015, U.S. Appl. No. 131844,282, filed Mar. 15, 2013.
Notice of Allowance dated Aug. 3, 2015, U.S. Appl. no. 13/964,112, filed Aug. 12, 2013.
Notice of Allowance dated Jul. 1, 2015, U.S. Appl. No. 14/075,663, filed Nov. 8, 2013.
Notice of Allowance dated Aug. 28, 2015, U.S. Appl. No. 14/446,330, filed Jul. 29, 2014.
FAIPP Pre-Interview Communication dated Aug. 5, 2015, U.S. Appl. No. 13/857,141, filed Apr. 4, 2013.
FAIPP Pre-Interview Communication dated Jun. 2, 2015, U.S. Appl. No. 13/857,139 filed Apr. 4, 2013.
Notice of Allowance dated Jun. 11, 2015, U.S. Appl. No. 13/857,138, filed Apr. 4, 2013.
Henderson, Tristan, et al., "On the Wire, Congestion Pricing: Paying Your Way in Communications Networks," University College London, Sep./Oct. 2001, retrieved from: http://tristan.host.cs.st-andrews.ac.uk!research/pubs/ieeeic01.pdf.

\* cited by examiner

VERIFICATION OF MOBILE DEVICE INTEGRITY DURING ACTIVATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices that are used for mobile voice and/or data communications based on wireless network connectivity, which can be provided by base stations known as cell towers or sites. Such electronic devices may be associated with an electronic serial number (ESN), a stock keeping unit (SKU) number, and other identifying information. Mobile telephones and similar electronic/communications devices may be packaged with operating manuals, warning documents, charging devices, and other accessories in a point-of-sale package suitable for distributing to end users. A plurality of point-of-sale packages, each containing an electronic device, may be shipped together to a retail store or business location. Electronic devices may be configured prior to shipping with unique packaging, hardware and software branding, features and functionality.

SUMMARY

In an embodiment, a mobile communication device is disclosed. The mobile communication device comprises a processor and a memory. The memory comprises a permissive portion, comprising an open mobile alliance (OMA) device management (DM) client application to provision the mobile communication device based on a state of a toggle key. The memory further comprises a trusted security zone portion, comprising the toggle key, wherein the toggle key controls whether or not the profile of the device is allowed to be provisioned into the device, wherein configurations of a network or an operating system associated with the network are provisioned during the profile provisioning. The trusted security zone portion further comprises a verification application, when executed by a trusted security zone portion of the processor examines an integrity of a preloaded open mobile alliance (OMA) device management (DM) payload, wherein a security key in the OMA DM payload is compared with a security key stored in the trusted security zone to determine the integrity of the OMA DM payload and to determine the state of a preloaded first operating system from a first network. The verification application further verifies the identification of the mobile communication device, transmits information comprising the security key in the trusted security zone to a server to verify network provisioning of the mobile communication device, and changes the toggle key based on the verification results, whereby asset migration between network carriers is achieved and unauthorized activities are avoided while security keys are kept confidential to individual carriers.

In an embodiment, a method of provisioning a mobile communication device during initial activation is disclosed. The method comprises verifying the identification of the mobile communication device by the mobile communication device, and transmitting information comprising a security key copied from a trusted security zone of a memory of the mobile communication device and an equipment serial number to a server with a server trusted security zone to verify network provisioning and identification of the mobile communication device. The method further comprises when the mobile communication device is determined by the server to be free from unauthorized provisioning, provisioning the mobile communication device by an OMA DM client application on the mobile communication device. The method further comprises when the mobile communication device is determined by the server to have been provisioned by an unauthorized source, preventing the mobile communication device from being activated, whereby unauthorized devices are prevented from utilizing a network.

In an embodiment, a method of provisioning a mobile communication device triggered by initial activation with a mobile device activation server with a server trusted security zone is disclosed. The method comprises verifying the identification of the mobile communication device by the mobile communication device, and transmitting information comprising a security key stored in a trusted security zone of a memory of the mobile communication device and an equipment serial number to the mobile device activation server. The method further comprises forwarding, by the mobile device activation server, the security key and the equipment serial number to a server at a communications service provider to verify network provisioning and identification of the mobile communication device respectively. The method further comprises when the mobile communication device is determined to be eligible for provisioning by the mobile device activation server, transmitting, by the mobile device activation server, provisioning information to the mobile communication device. The method further comprises when the mobile communication device is determined to be ineligible for provisioning by the mobile device activation server, provisioning, by the mobile device activation server, limited network access to the mobile communication device compared to network access privilege provisioned to mobile communication devices that are eligible for provisioning by the mobile device activation server, whereby secure and efficient access to a network of the mobile device activation server is promoted.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
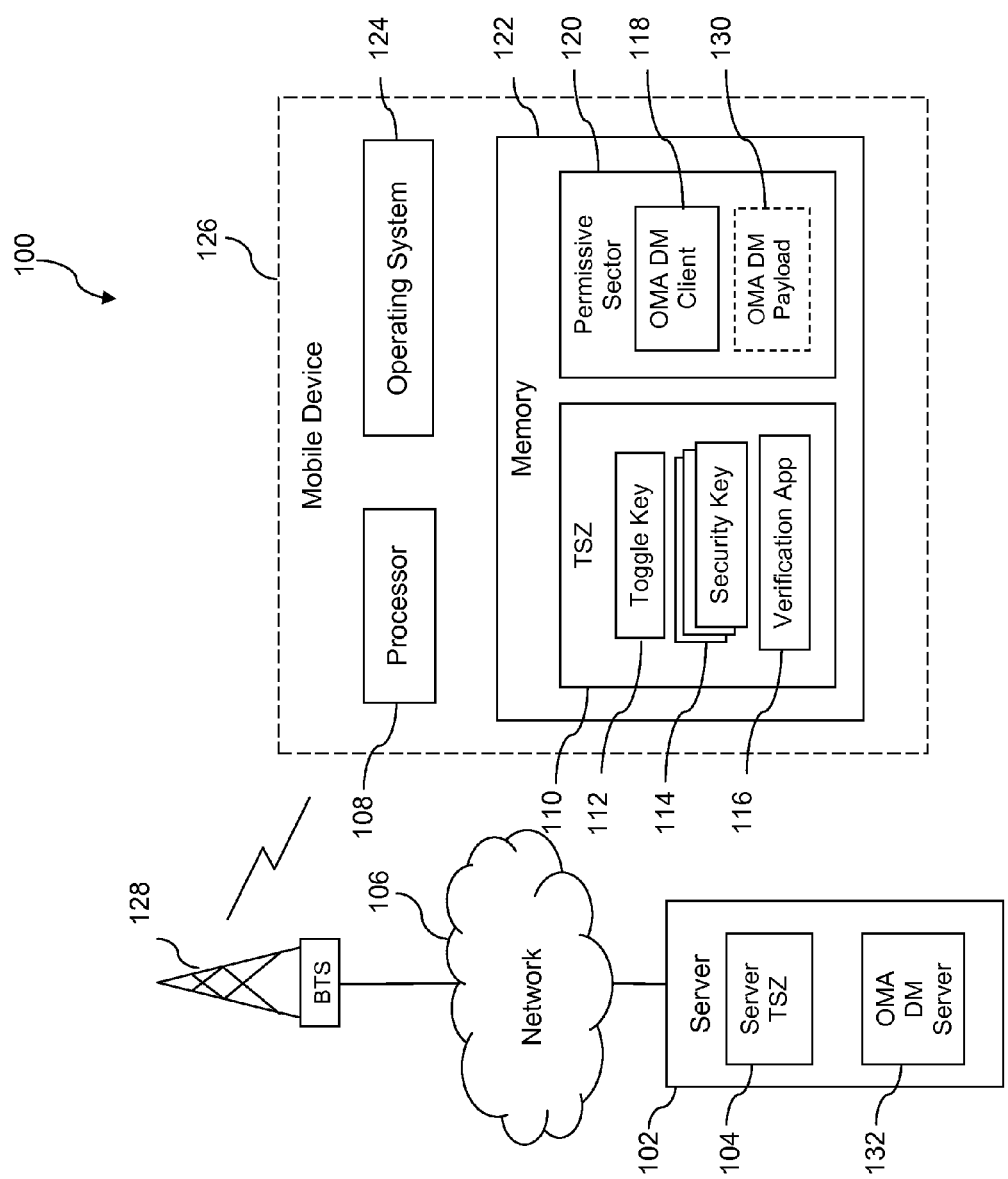
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Problems may be caused by mobile communication devices that obtain privileged control—for example to deceive a network. The problems may result from mobile communication devices that are rooted. Rooting may be performed with the goal of overcoming limitations that network carriers or hardware manufacturers set on the mobile communication devices. For example, rooting may be done to unlock a phone (e.g., change restrictions on the phone to enable it to activate on a network operated by a different wireless service provider than the service provider who subsidized the user's phone purchase). The result of rooting may be the ability to alter or replace system applications and settings, run specialized applications that require administrator-level permissions, or perform other operations that are otherwise inaccessible to a normal user of the mobile communication device. Rooting may also facilitate removal and replacement of the device's operating system. Additionally, rooting may enable a mobile communication device to deceive a network that the mobile communication device is not supposed to be supported by. For example, if a mobile communication device was obtained from a first network with a subsidy and is later rooted and activated on a second network, the user of the mobile communication device may stop paying service fees to the first network when the mobile communication device is not receiving services from the first network carrier. A mobile communication device may be considered "stolen" from the first network carrier when the mobile communication device whose purchase was subsidized moves to other networks for service before completion of a contract period. The mobile communication device may deceive to "steal" services from the second network carrier while the mobile communication device is not supposed to be supported by the second network carrier.

The present disclosure teaches a system and method for verifying a mobile communication device before initially provisioning the device. For example, a verification application on a mobile communication device may perform a device verification process on the mobile communication device comprising a variety of functions to verify whether or not the mobile communication device is free from unauthorized manipulation, for example unauthorized provisioning. The device verification may comprise verifying integrity of a preloaded open mobile alliance (OMA) device management (DM) payload, verifying the identity of the mobile device, verifying network provisioning on the mobile device with a server from a wireless communications service provider, or another type of device verification functionality. Under different circumstances, the verification application may perform different functions, for example during initial activation of the mobile communication device, when the mobile communication device migrating from one network to another network, or under some other circumstance.

At the time of initial activation, the verification application may examine the identification of the mobile device to verify the mobile device is what the mobile device indicates to the network that it is, for example by examining an equipment identifier or an equipment identification number of the mobile communication device (e.g., an international mobile station equipment identity or IMEI) with predefined rules. The verification application may examine a preloaded OMA DM payload on the mobile device, if any, with predefined method(s). For example, the size of an OMA DM payload may be calculated and compared to a size value included in the OMA DM payload. When the two sizes match, the OMA DM payload may be determined by the verification application to be free from unauthorized manipulation; otherwise, the OMA DM payload may be determined to have been manipulated by unauthorized source(s) or otherwise unauthorized (e.g., possibly the payload has been garbled in transit). A cyclic redundancy check (CRC) calculation may be performed by the verification application over an OMA DM payload and then compared to an authoritative CRC value. When the CRC value calculated from the OMA DM payload matches the authoritative CRC value, the OMA DM payload may be determined by the verification application to be free from unauthorized manipulation; otherwise, the OMA DM payload may be determined to have been manipulated by unauthorized source(s) or may otherwise be deemed unauthorized. The format of the OMA DM payload may be compared by the verification application to a predefined payload format. When both formats match, the OMA DM payload may be determined to be free from unauthorized manipulation; otherwise, the OMA DM payload may be determined to have been manipulated by unauthorized source(s) or may otherwise be deemed unauthorized.

Additionally, the verification application may transmit a security key stored in a trusted security zone portion of a memory on the mobile communication device, an equipment identification number, or other relevant information to a server for verification. The server may be installed with a server trusted security zone. The mobile device may perform its initial activation with a server from a wireless communications service provider or with a mobile device activation server, for example a third party server not maintained by a wireless communications service provider. A wireless communications service provider may be referred to as a network carrier herein. The server maintained by the network carrier may verify the identification of the mobile communication device and whether or not the mobile communication device is free from unauthorized provisioning. For example, the server may identify the type of the mobile communication device and/or what network the mobile communication device may be on by examining the security key. The server may determine which specific device the mobile communication device is by examining the equipment identification number.

The third party server may be from an organization, for example an enterprise, which is not a wireless communications service provider. The third party server may forward the received security key, the equipment identification number, or other relevant information to a server maintained by a network carrier that supports the mobile communication device or to a server from a common platform. The server may verify the identification of the mobile communication device and whether or not the mobile communication device is free from unauthorized provisioning. For example, the server may identify the type of the mobile communication device and/or what network the mobile communication device may be on by examining the security key. The server may determine which specific device the mobile communication device is by examining the equipment identification number.

A notification comprising a verification result may be transmitted to the mobile communication device when the server that verifies the mobile communication device completes the part of verification on the server side. A toggle key may be stored in the trusted security zone of the mobile communication device and utilized to enable or disable functionality to provision the profile of the mobile communication device. The profile provisioning of the mobile device may comprise provisioning the operating system and/or a supporting network. The toggle key may be set to a default value to indicate that the profile of the mobile device may not be provisioned at the manufacturer. The toggle key may be configured by the verification application under predefined circumstances, for example at initial activation of the mobile device, at migration from one network to another network, or under some other circumstance, after completion of device verification. For example, when the mobile communication device is determined to be free from unauthorized provisioning and/or manipulation by the verification application, the toggle key may be set to a first value that enables the profile provisioning to the mobile communication device; otherwise, the verification application may set a second value to the toggle key to disable profile provisioning to the mobile communication device. When the mobile communication device is determined to be free from unauthorized provisioning and the toggle key allows profile provisioning to the mobile communication device, provisioning content may be transmitted to the mobile communication device, and an OMA DM client application on the mobile communication device may provision the mobile device with the received provisioning content.

When a mobile communication device is migrating from one network to another network, for example from a first network to a second network, from a cellular network to a wireless local area network (WLAN), or another type of migration between networks, the mobile communication device may also be verified before provisioning, for example by a server from the second network carrier. The verification process and provisioning process are similar to the process at initial activation for the mobile communication device. When a mobile communication device is determined to be free from unauthorized provisioning, the mobile communication device may be provisioned by an OMA DM client application with provisioning content received from the server. A second security key may be deposited into a trusted security zone of the memory on the mobile communication device to correspond to the second network and/or a corresponding second operating system. The trusted security zone may be described hereinafter.

Turning now to FIG. 1, a communication system 100 is described. In an embodiment, the communication system 100 comprises a plurality of mobile communication devices 126 and a server 102. The mobile device 126 may comprise a processor 108, an operating system 124, and a memory 122. The memory may comprise a trusted security zone portion 110 and a permissive sector 120. The trusted security zone 110 may comprise a toggle key 112, a plurality of security keys 114, and a verification application 116. The permissive sector 120 may comprise an open mobile alliance (OMA) device management (DM) client application 118 and/or an OMA DM payload 130. The mobile device 126 may be configured to use a radio transceiver to establish a wireless communication link with a base transceiver station (BTS) 128, and the base transceiver station 128 may provide communications connectivity of the device 126 to a network 106. The server 102 may be a server maintained by a wireless communications service provider and may also have access to the network 106. The network 106 may comprise any combination of private and public networks. A wireless communications service provider may also be referred to as a network carrier herein.

It is understood that the system 100 may comprise any number of mobile devices 126, any number of base transceiver stations 128, and any number of servers 102. The collectivity of base transceiver stations 128 may be said to comprise a radio access network, in that these base transceiver stations 128 may provide a radio communication link to the mobile devices 126 to provide access to the network 106.

The radio transceiver of the mobile communication device 126 may communicate with the base transceiver station 128 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The mobile device 126 may be any of a mobile phone, a personal digital assistant (PDA), a media player, a laptop computer, a tablet computer, a notebook computer, or another network/communications capable device. In an embodiment, the mobile communication device 126 may have other components (not shown) such as a near field communication (NFC) radio transceiver, a short range radio transceiver such as a wireless local area network (WLAN) radio transceiver, or other components.

The toggle key 112 may be stored in the trusted security zone 110. The toggle key 112 may be utilized to enable or disable functionality to provision the profile of the mobile device 126. Provisioning a mobile communication device 126 may be a process where a mobile communication device 126 that is not provisioned for a user account currently associated with an active subscription with a service provider (e.g. a wireless communications service provider) is updated with data, parameters, and/or software applications, typically for the first time, associating the mobile communication device 126 with a user account and supplying service to the mobile communication device 126. The toggle key 112 may be set to a default value to indicate that the profile of the mobile device 126 may not be provisioned at the manufacturer. The toggle key 112 may be configured by the verification application 116 under predefined circumstances, for example at initial activation of the mobile device 126, at migration from one network to another network, or under another circumstance.

The profile provisioning of the mobile device 126 may comprise provisioning the operating system 124 and/or a supporting network. A value of 1 of the toggle key 112 may disable profile provisioning the mobile device 126 and a value of 0 of the toggle key 112 may enable the provisioning the profile of the mobile device 126. For example, when the toggle key 112 is set to be 1, the operating system 124 and/or the supporting network of the mobile device 126 may not be set or changed. For example, the OMA DM client application 118 may examine the value of the toggle key 112 before provisioning the mobile communication device 126, and the operating system 124 and/or the supporting network may not be set or changed by the OMA DM client application 118 when the toggle key 112 is set to 1. When the toggle key 112 is set to be 0, the operating system 124 and/or the supporting network of the mobile device 126 may be set or changed.

The toggle key 112 may be configured by the verification application 116, for example after completion of device verification. The device verification may comprise verifying integrity of a preloaded OMA DM payload 130, verifying the identity of the mobile device 126, and/or verifying network provisioning on the mobile device 126 with the server 102. The toggle key 112 may be examined by the OMA DM client application 118 before the OMA DM client application 118 provisions the mobile device 126. When the toggle key 112 allows the profile of the mobile device 126 to be provisioned, the OMA DM client application 118 may provision the mobile device 126 with an operating system or portions of an operating system and/or a supporting network.

The security key 114 may be stored in the trusted security zone 110. A plurality of the security keys 114, for example 8, 16, 24, or another number of security keys 114, may be stored in the trusted security zone 110. Each of the security key 114 may correspond to an instance of profile provisioning items, for example an operating system 124 or a network carrier. Security keys 114 may be known to different carriers who use them to access and interact with carrier dedicated sub-trusted-security-zones. Thus, security keys may be kept confidential to individual carriers. The security keys 114 may be compared by the verification application 116 against a security key 114 from the OMA DM payload 130, for example to determine whether the OMA DM payload 130 is free from unauthorized provisioning. When any of the security keys 114 matches up with the security key from the OMA DM payload 130, the OMA DM payload 130 may be determined to be free from unauthorized provisioning.

The server trusted security zone 104 may be stored in a memory of the server 102. The server trusted security zone 104 may communicate with the trusted security zone 110 on the mobile device 126. For example, the trusted security zone 110 may transmit network provisioning information and/or other information to the server trusted security zone 104. The server trusted security zone 104 or a trusted application in the server trusted security zone 104 may examine the network provisioning information and/or other information from the mobile device 126 to determine whether the network provisioning of the mobile device 126 is free from unauthorized sources. For example, the server trusted security zone 104 may identify the type of the mobile device 126 and/or what network the mobile device 126 may be on by examining the security key 114. The server trusted security zone 104 may determine which specific device the mobile device 126 is by examining the equipment identification number. When the mobile device 126 is determined to be free from unauthorized network provisioning, the server trusted security zone 104 may transmit a notification to the server trusted security zone 110 indicating that the mobile device is free from unauthorized network provisioning.

The OMA DM client application 118 may be stored in the permissive sector 120 of the memory 122 on the mobile device 126. The OMA DM client application 118 may provision the mobile device 126 under predefined circumstances, for example, at the time of a hands-free activation (HFA) device profile reset, at the time of a complete device factory reset, at the time of a new network device start-up, at the time of an OMA DM profile change, or under another circumstance. The provisioning may comprise profile provisioning and non-profile provisioning. With profile provisioning, an operating system, a network, or both may be provisioned to the mobile device 126. The profile may comprise information that promotes conducting wireless communications, for example a network access identity. The network access identity may be used to authorize access of the mobile communication device 126 to the wireless link provided by the base transceiver station 128 and/or to the network 106.

The profile may further comprise information that may be used to generate operational run-time parameters for wireless communication. The information may comprise one or more lists of wireless communication networks that the mobile communication device 126 is authorized to attach to, a rule set for prioritizing among the networks identified in the one or more lists, and one or more tables of device rules. For example, the lists of wireless communication networks may comprise one or more of a PRL, a PLMN list, an OPLMN list, an EHPLMN list, an HPLMN list, an MSPL table, and an MLPL table.

PRL stands for a preferred roaming list. PLMN stands for public land mobile network. The PLMN list may comprise a list of public land mobile networks and/or other lists, such as an EHPLMN list or an OPLMN list. OPLMN stands for operator controlled PLMN. EHPLMN stands for an equivalent home PLMN. The HPLMN list is a home PLMN file that may comprise a list of networks or communication systems identified by mobile country code (MCC). MSPL stands for MMSS (multi-mode system selection) System Priority List. MLPL stands for MMSS Location Associated Priority List.

These lists and/or tables may be said to implement, define, and/or describe a coverage map. In an embodiment, before the mobile device 126 can be provisioned, the mobile device 126 may be examined to determine whether the mobile device 126 is free from unauthorized or malicious manipulation, for example whether or not the mobile device 126 has been rooted.

Rooting may be done to unlock a phone (e.g., change restrictions on phone to enable it to activate on a network operated by a different wireless service provider than the service provider who subsidized the user's phone purchase). The result of rooting may be the ability to alter or replace system applications and settings, run specialized applications that require administrator-level permissions, or perform other operations that are otherwise inaccessible to a normal user of the mobile communication device 126. Rooting may also facilitate removal and replacement of the device's operating system. Additionally, rooting may enable a mobile communication device 126 to deceive a network that the mobile communication device 126 is not supposed to be supported by.

The OMA DM client application 118 may communicate with the verification application 116 to obtain an examination/verification result for the mobile device 126. For example, before provisioning the mobile device 126, the OMA DM client application 118 may send an inquiry to the verification application 116 requesting the device verification result. Alternatively, the verification application 116 may send a notification to the OMA DM client application 118 indicating the device verification result when the device verification process is complete.

The OMA DM client application 118 may also examine the value of the toggle key 112 before provisioning the mobile communication device 126. For example, a function of the verification application 116 may be invoked by the OMA DM client application 118, and the verification application 116 may access the toggle key 112. Or, the verification application 116 may comprise an application programming interface (API) that resides in the permissive sector 120. The OMA DM client application 118 may invoke functions of the application programming interface, and the application programming interface may communicate with the verification application 116. The verification application 116 may access the toggle key 112 to examine its value. Alternatively, a portion of the OMA DM client application 118 may be stored in and/or executed in the trusted security zone 110. For example, a verification component or functionality of the OMA DM client application 118 may access the toggle key 112.

When the value of the toggle key 112 allows the mobile communication device 126 to be provisioned by the OMA DM client application 118 and when the mobile device 126 is determined to be free from unauthorized or malicious manipulation, the OMA DM client application 118 may provision the mobile device 126. As discussed earlier, the provisioning may comprise profile provisioning and non-profile provisioning. The non-profile provisioning may comprise service provisioning, or another type of provisioning. With the network provisioning, the mobile device 126 may be provisioned with network related settings, for example a category of network, a quality of network, or another type of network related settings.

When the mobile device 126 is provisioned with network provisioning, the mobile device 126 may have the capability to communicate with the network 106. The service provisioning may comprise service settings, application installation, or another type of service provisioning. When provisioned with service provisioning, the mobile device 126 may have more functionality than only communicating with the network 106. For example, service provisioning may enable games, media playing, or another type of functionality other than network ability. When the mobile device 126 is determined to have been manipulated by unauthorized source(s) (e.g., rooted), the OMA DM client application 118 may not provision the mobile device 126. When the mobile device 126 is not provisioned by the OMA DM client application 118, the mobile device 126 may not have the capability to communicate to the network 106, or to another mobile device through the network 106.

The verification application 116 may be stored in the trusted security zone 110. When executed by a trusted security portion of the processor 108, the verification application 116 may perform a variety of processes to examine whether or not the mobile device 126 is free from unauthorized manipulation. For example, the verification application 116 may perform a verification process for the mobile device 126. The verification application 116 may communicate with the OMA DM client application 118 on the mobile device 126 and/or the server trusted security zone 104 on the server 102 during the verification process for the mobile device 126.

The verification application 116 may monitor triggering events that may trigger the OMA DM client application 118 to provision the mobile device 126. Alternatively, the OMA DM client application 118 may transmit a notification to the verification application 116 when a triggering event occurs. When a triggering event occurs, the verification application 116 may start the verification process to determine whether or not the mobile device 126 is free from unauthorized manipulation. For example, the verification application 116 may verify identification of mobile device 126 with predefined rules. The mobile device 126 may comprise an equipment identification number, for example an equipment serial number, an international mobile equipment identity (IMEI), or another type of identification number.

The verification application 116 may examine the integrity of a preloaded OMA DM payload 130. For example, when one security key 114 is stored in the trusted security zone 110, the verification application 116 may compare the security key 114 stored in the trusted security zone 110 with a security key stored in the OMA DM payload 130. When the two security keys match, the OMA DM payload 130 may be determined to be free from unauthorized manipulation, for example unauthorized provisioning. When more than one security key 114 is stored in the trusted security zone 110, the verification application 116 may compare the security key stored in the OMA DM payload 130 with the plurality of security keys 116 stored in the trusted security zone 110. If any of the security keys 114 from the trusted security zone 110 matches the security key from the OMA DM payload 130, the OMA DM payload 130 may be determined to be free from unauthorized manipulation.

The verification application 116 may communicate with the server trusted security zone 104 to examine whether or not the mobile device 126 is free from unauthorized provisioning. For example, the verification application 116 may transmit network provisioning information, a security key 114 stored in the trusted security zone 110, an equipment identification number, and/or other information to the server trusted security zone 104. The equipment identification number may be an equipment serial number, an international mobile equipment identity (IMEI), or another type of identification number.

In an embodiment, the server trusted security zone 104 may determine whether or not the mobile device 126 is free from unauthorized network provisioning with the network provisioning information, the security key 114 stored in the trusted security zone 110, the equipment identification number, and/or the other information transmitted from the verification application 116. For example, the server 102 may identify the type of the mobile device 126 and/or what network the mobile device 126 may be on by examining the security key 114. The server 102 may determine which specific device the mobile device 126 is by examining the equipment identification number.

The verification process that the verification application 116 performs may comprise a root detection process. The root detection process may examine default files, configurations, or other relevant elements on the mobile device 126. For example, it may be examined whether or not relevant over-the-air (OTA) certificates are present on the mobile device 126. When any of the relevant over-the-air certificates are not found, the mobile device 126 may be determined to have been provisioned by unauthorized source(s). The configurations that the root detection process may examine may include permission settings.

When any of the above steps of the verification process fails, the mobile device 126 may be determined to have been provisioned by unauthorized source(s), and the mobile device 126 may not be provisioned to use the network 106. Alternatively, the mobile device 126 may be provided with limited access to the network 106 and/or may be offered with an option to register to the network 106 for further action.

The verification application 116 may change the toggle key 112 value based on verification results. For example, if the mobile device 126 is determined to be free from unauthorized provisioning, the verification application 116 may set the toggle key 112 value to indicate that the profile of the mobile device 126 may be provisioned by the OMA DM client application 118. On the other hand, if the mobile device 126 is determined to have been provisioned by and/or tampered with by unauthorized source(s), the verification application 116 may set the toggle key 112 value to indicate that the profile of the mobile device 126 may not be provisioned by the OMA DM client application 118. When the profile of the mobile device 126 is not provisioned, the mobile device 126 may have limited access to the network 106, for example to make emergency calls, customer care calls, or another type of service. Before provisioning the mobile device 126, the OMA DM client application 118 may examine the toggle key 112 to determine whether or not the profile of the mobile device 126 may be provisioned.

The verification application 116 may communicate with the OMA DM client application 118 to learn and/or determine whether or not the mobile device 126 is free from unauthorized manipulation. For example, the verification application 116 may transmit a notification to the OMA DM client application 118 when the mobile device 126 is determined to be free from unauthorized provisioning. The OMA DM client application 118 may provision the mobile device 126 when the mobile device 126 is determined to be free from unauthorized provisioning. The verification application 116 may also transmit a notification to the OMA DM client application 118 when the mobile device 126 is determined to have been provisioned by unauthorized source(s). The OMA DM client application 118 may not provision the mobile device 126 when the mobile device 126 is determined to have been provisioned by unauthorized source(s).

Under various predefined circumstances, the verification application 116 may perform different functions, for example, at initial activation with a wireless communications service provider that provides cellular communications service to the mobile device 126, at initial activation with a third party server other than a wireless communications service provider that provides cellular communications service to the mobile device 126, at migration from one network to another network, or under another predefined circumstance. The case of initial activation with a wireless communications service provider that provides cellular communications service to the mobile device 126 may be discussed below with reference to FIG. 2. The case of initial activation with a third party server other than a wireless communications service provider that provides cellular communications service to the mobile device 126 may be discussed below with reference to FIG. 3. The case of the mobile device 126 migrating from one network to another network may be discussed in the following section.

When the verification application 116 is executed at migration of the mobile device 126 from a first network to a second network, for example from a first network carrier to a second network carrier, or from a cellular network to a wireless local area network (WLAN) such as a WiFi network, the verification application 116 may perform a verification process comprising a variety of functions. For example, the verification application 116 may examine a preloaded OMA DM payload 130 to verify the integrity of the OMA DM payload 130. For example, the size of an OMA DM payload 130 may be calculated and compared to a size value included in the OMA DM payload 130. When the two sizes match, the OMA DM payload 130 may be determined by the verification application 116 to be free from unauthorized manipulation; otherwise, the OMA DM payload 130 may be determined to have been manipulated by unauthorized source(s). A cyclic redundancy check (CRC) calculation may be performed by the verification application 116 over an OMA DM payload 130 and then compared to an authoritative CRC value. When the CRC value calculated from the OMA DM payload 130 matches the authoritative CRC value, the OMA DM payload 130 may be determined by the verification application 116 to be free from unauthorized manipulation; otherwise, the OMA DM payload 130 may be determined to have been manipulated by unauthorized source(s). The format of the OMA DM payload 130 may be compared by the verification application 116 to a predefined payload format. When both formats match, the OMA DM payload 130 may be determined to be free from unauthorized manipulation; otherwise, the OMA DM payload 130 may be determined to have been manipulated by unauthorized source(s).

The mobile device 126 may be loaded with a first network and/or a corresponding first operating system. The verification application 116 may examine the state of the first operating system to determine whether or not the mobile device 126 is intact. The verification application 116 may determine the identification of the mobile device 126. Additionally, the verification application 116 may transmit a first security key 114 stored in the trusted security zone 110, an equipment identification number, and/or other relevant information to the server 102. The server 102 may determine whether the mobile device 126 is intact based on the received relevant information from the verification application 116 and transmit a notification comprising verification results to the mobile device 126.

When the mobile device 126 passes the verification process, the mobile device 126 may be provisioned by the server 102. A second network and/or a corresponding second operating system may be provisioned to the mobile device 126 as part of the provisioning process. A second security key may be transmitted by the server trusted security zone 104 and stored into the trusted security zone 110 of the mobile device 126 to correspond to the second network and/or the corresponding second operating system. The second security key may be deposited in a different slot than the first security key 114. Thus, asset migration between network carriers may be achieved and unauthorized activities may be avoided while security keys 114 may be kept confidential to individual carriers. When a user of a mobile communication device 126 decides to terminate service with the network and the security key 114 is matched at the network, the mobile communication device 126 may be removed from a network access permission list.

A total of a predefined number, for example 8, 16, 24, or another number of security keys 114 may be deposited in the trusted security zone 110, to correspond to a plurality of distinct operating systems, a plurality of distinct networks, or any combination of the two. Each of the security keys may be associated with a different sub-section or sub-partition of the trusted security zone. For further details about multiple trusted security zones within a trusted security zone, see U.S. patent application Ser. No. 13/571,348, filed on Aug. 10, 2012, entitled "Systems and Methods for Provisioning and Using Multiple Trusted Security Zones on an Electronic Device", by Stephen J. Bye, et al., which is incorporated by reference in its entirety.

Figure 2:
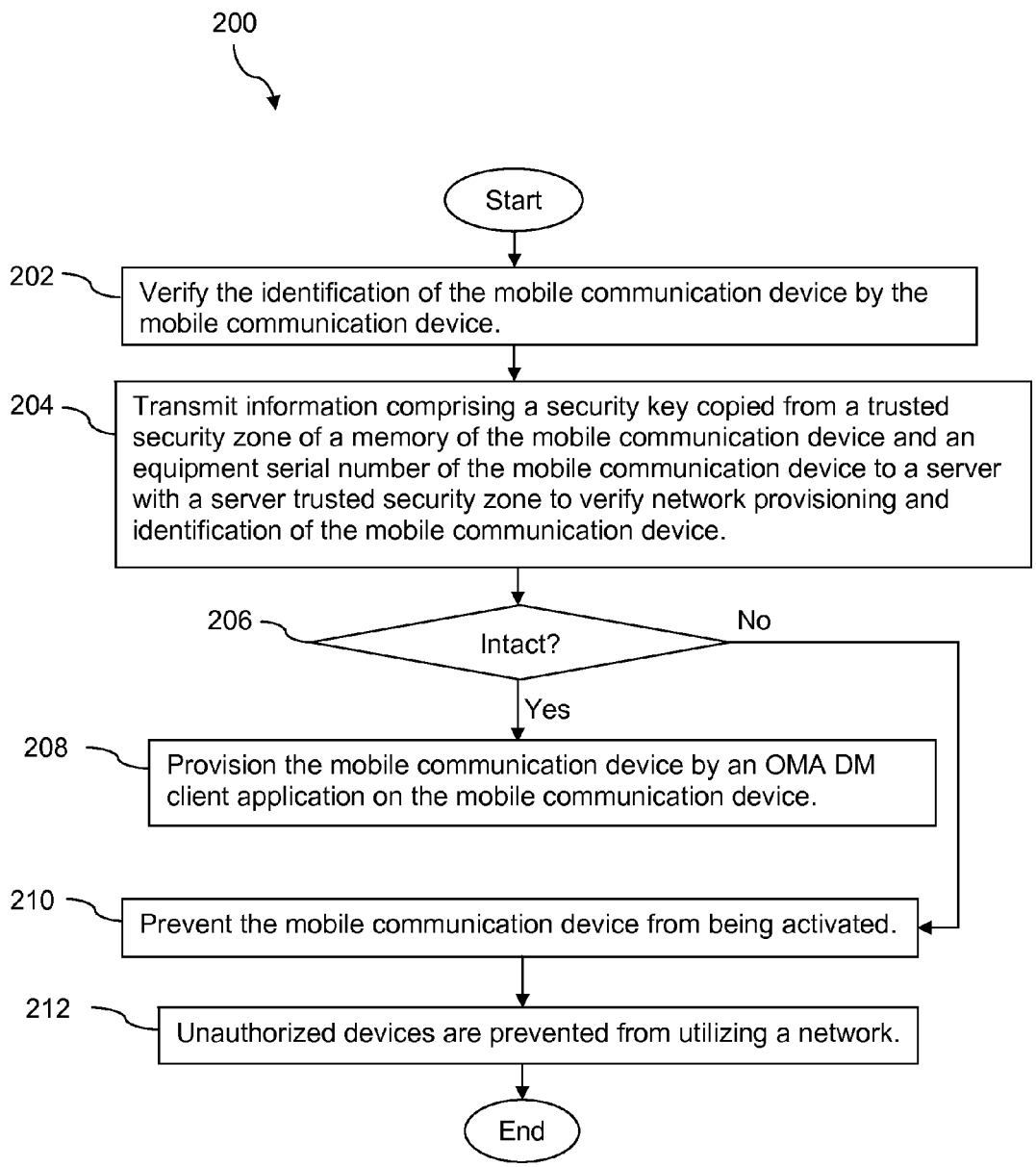
FIG. 2 is a flow chart illustrating a method according to an embodiment of the disclosure.

Turning now to FIG. 2, a method 200 is described. At block 202, the identification of the mobile communication device is verified by the mobile communication device. The identification of the mobile communication device 126 may be verified by the mobile communication device 126, for example by examining an equipment identifier or an equipment identification number of the mobile communication device (e.g., an international mobile station equipment identity or IMEI) with predefined rules. At block 204, information is transmitted comprising a security key copied from a trusted security zone of a memory of the mobile communication device and an equipment serial number of the mobile communication device to a server with a server trusted security zone to verify network provisioning and identification of the mobile communication device respectively. For example, information may be transmitted comprising a security key 114 copied from the trusted security zone 110 of the memory 122 of the mobile communication device 126 and/or an equipment serial number to the server 102 with the server trusted security zone 104 to verify network provisioning and identification of the mobile communication device 126 respectively.

Only one security key 114 may be found in the trusted security zone 110 at initial activation of the mobile device 126. In an embodiment, an application stored in the server trusted security zone 104 may be executed by a trusted security zone portion of a processor of the server 102. The application may compare the security key 114 from the mobile device 126 with security key(s) stored in a data store of the server 102. The application may compare the equipment serial number from the mobile device 126 with equipment serial numbers stored in the data store. The type of the mobile device 126 and/or what network the mobile device 126 should be on, for example the network that subsidized the mobile device 126, may be determined by the server 102 through examining the security key 114. Which specific device the mobile device 126 is may be determined by the server 102 through examining the equipment serial number.

At block 206, it is determined whether or not the mobile device is free from unauthorized provisioning. When the result of block 206 is true, which means the mobile device 126 is free from unauthorized provisioning, the method 200 proceeds to block 208. On the other hand, when the result of block 206 is false, which means the mobile device 126 has been rooted, provisioned from unauthorized source(s), or both, the method 200 proceeds to block 210. At block 208, the mobile communication device is provisioned by an OMA DM client application on the mobile communication device. For example, the mobile device 126 may be provisioned by the OMA DM client application 118. The OMA DM payload to provision the mobile device 126 may be transmitted from the server 102, for example by the OMA DM server application 132.

When the network for the mobile device 126 is determined by the server 102, the profile provisioning content may be determined, for example network provisioning content and/or a corresponding operating system provisioning content. Information of a variety of user groups may be stored on the server 102. For example, an executive group, a technology group, and a worker group may be different user groups for an enterprise. Mobile communication devices 126 associated with distinct groups may be assigned with distinct provisioning content, for example distinct application installation, distinct access right, or other settings. The user group of the mobile device 126 may be determined by examining the user group information stored in the memory 122, the security key 114, and/or the equipment identification number of the mobile device 126. When the provisioning settings are determined by the server 102, the OMA DM server application 132 on the server 102 may transmit an OMA DM payload to the mobile device 126 comprising the provisioning settings. Upon receipt of the OMA DM payload 130, the OMA DM client application 118 may provision the mobile device 126 with information from the OMA DM payload 138.

At block 210, the mobile communication device is prevented from being activated. For example, when the mobile communication device 126 is determined to have been provisioned by unauthorized source(s), the mobile communication device 126 may be prevented from being activated. For example, the activation process on the mobile communication device 126 may be disabled. In an embodiment, the mobile communication device 126 may still be able to make emergency calls and customer care calls even when the mobile communication device 126 is not activated. At block 212, unauthorized devices are prevented from utilizing a network. For example, unauthorized mobile communication devices 126 may not be activated and thus may be prevented from utilizing the network 106.

Figure 3:
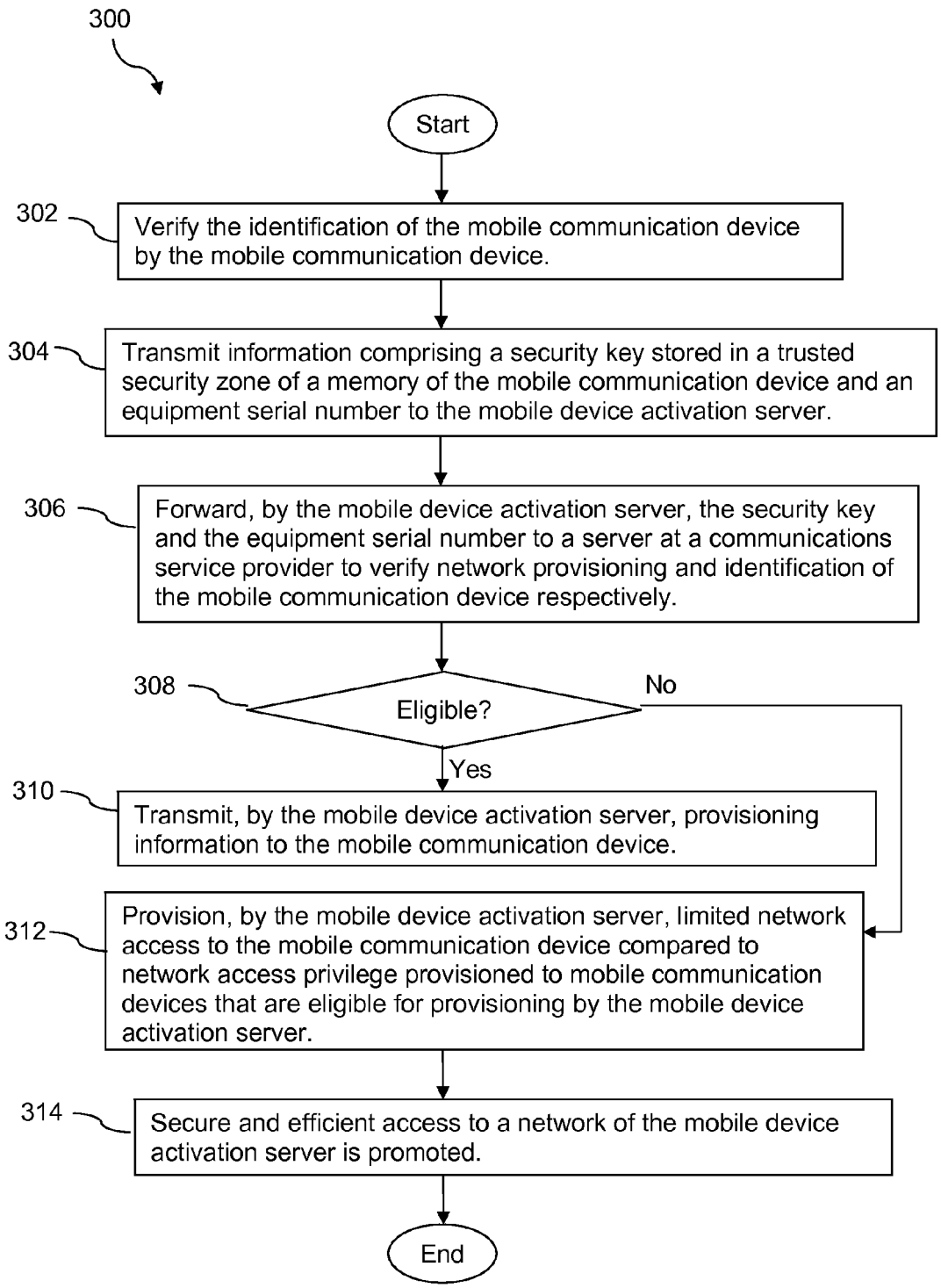
FIG. 3 is a flow chart illustrating another method according to an embodiment of the disclosure.

Turning now to FIG. 3, a method 300 is described. At block 302, the identification of the mobile communication device 126 is verified by the mobile communication device. At block 304, information is transmitted comprising a security key stored in a trusted security zone of a memory of the mobile communication device and an equipment serial number to the mobile device activation server. For example, when the verification application 116 is executed at the time of initial activation of the mobile device 126 to communicate with a mobile device activation server, for example a third party server other than the server 102 maintained by the wireless communications service provider, the verification application 116 may perform a variety of functions similar to functions performed by the verification application 116 when the initial activation is performed with the server 102 from the wireless communications service provider.

The mobile communication device 126 may be supported by a cellular network maintained by the wireless communications service provider. The mobile device activation server may not be a server from the wireless communications service provider and instead may be a server from an organization, for example an enterprise. The verification application 116 may transmit a security key 114 stored in the trusted security zone 110, an equipment identification number, and/or other information to a mobile device activation server. The mobile device activation server may be installed with a server trusted security zone.

At block 306, the security key and the equipment serial number are forwarded by the mobile device activation server to a server at a communications service provider to verify network provisioning and identification of the mobile communication device respectively. For example, the mobile device activation server may communicate with the server 102 to determine whether or not the mobile device 126 is intact. For example, the mobile device activation server may forward the received security key 114, the equipment identification number, and/or the other information received from the mobile device 126 to the sever 102.

At block 308, it is determined whether or not the mobile communication device is eligible for provisioning by the mobile device activation server. For example, the server 102 may determine whether or not the mobile device 126 is intact and transmit a notification comprising the verification result to the mobile device activation server. When the mobile device 126 is determined by the server 102 to be free from unauthorized provisioning, the mobile device activation server may further determine whether or not the mobile device 126 is eligible for the mobile device activation server to provision. When the result of block 308 is true, which means the mobile device 126 is eligible to be provisioned by the mobile device activation server, the method proceeds to block 310. On the other hand, when the result of block 308 is false, which means the mobile device 126 is ineligible to be provisioned by the mobile device activation server, the method proceeds to block 312.

At block 310, provisioning information is transmitted by the mobile device activation server to the mobile communication device. When the mobile device 126 is determined to be eligible to be provisioned by the mobile device activation server, the mobile device activation server may determine provisioning content and transmit the provisioning content to the mobile device 126, for example through the OMA DM client application 118, and request the OMA DM client application 118 to provision the mobile device 126. Alternatively, the server 102 may transmit the provisioning content to the mobile device 126 through the OMA DM client application 118 and request the OMA DM client application 118 to provision the mobile device 126.

Alternatively, a common platform may be utilized for this purpose. For example, a common platform with a platform trusted security zone may communicate with various communications network providers and third parties for device integrity verification and asset migration between communications network providers and third parties. For example, both the server 102 and the mobile device activation server may communicate with the platform to determine whether the mobile device 126 is intact. In an embodiment, a token may be used by a network carrier to communicate with the common platform. The token may be a common token for a plurality of network carriers that operate with the common platform or a distinct token for an individual network carrier. The platform may maintain a data store for security keys, equipment identification numbers, network provisioning information, and/or other information for various network carriers.

The mobile device activation server may forward the received security key 114, the equipment identification number, and/or the other information received from the mobile device 126 to the platform. The common platform may determine whether the mobile device 126 is intact and transmit a notification comprising the verification result to the mobile device activation server. The common platform may determine provisioning content for the mobile device 126 and/or transmit the provisioning content to the mobile device 126, for example from the OMA DM server application 132 to the OMA DM client application 118, and request the OMA DM client application 118 to provision the mobile device 126. Alternatively, the mobile device activation server may determine provisioning content for the mobile device 126 and/or transmit the provisioning content to the mobile device 126, for example from an OMA DM server application on the mobile device activation server to the OMA DM client application 118, and request the OMA DM client application 118 to provision the mobile device 126.

With the mobile device activation server, a user group for the mobile device 126 may be determined. User group specific provisioning content may be transmitted to the mobile device 126 by the mobile device activation server, the server 102, or the common platform.

At block 312, limited network access is provided by the mobile device activation server to the mobile communication device 126 compared to network access privilege provisioned to mobile communication devices 126 that are eligible for provisioning by the mobile device activation server. At block 314, secure and efficient access to a network of the mobile device activation server is promoted. For example, the network of the mobile device activation server may be a third party network. Secure and efficient access to the network of the mobile device activation server may be promoted by provisioning limited network access to mobile devices 126 that are ineligible for provisioning by the mobile device activation server.

Figure 4:
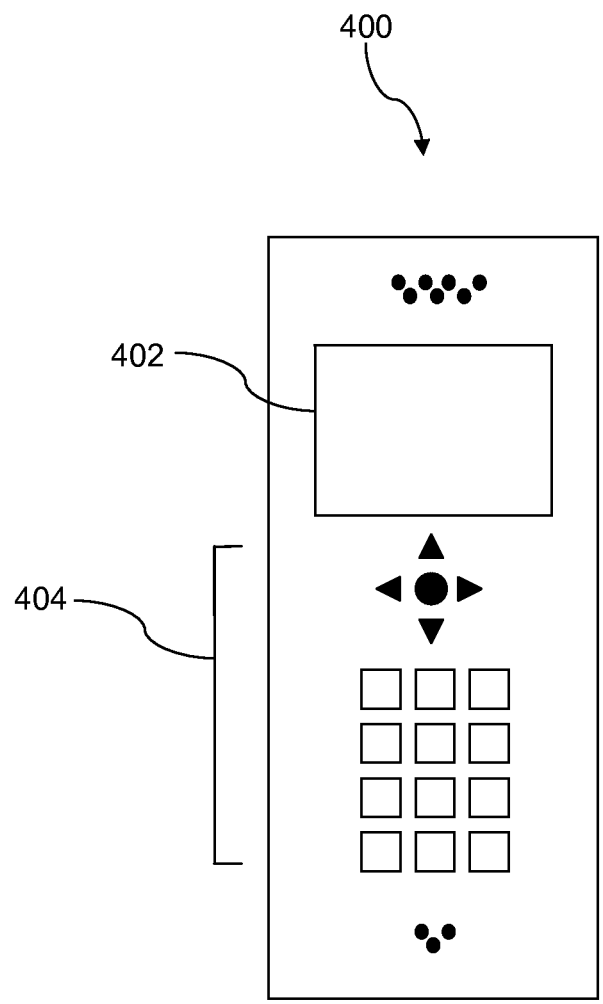
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
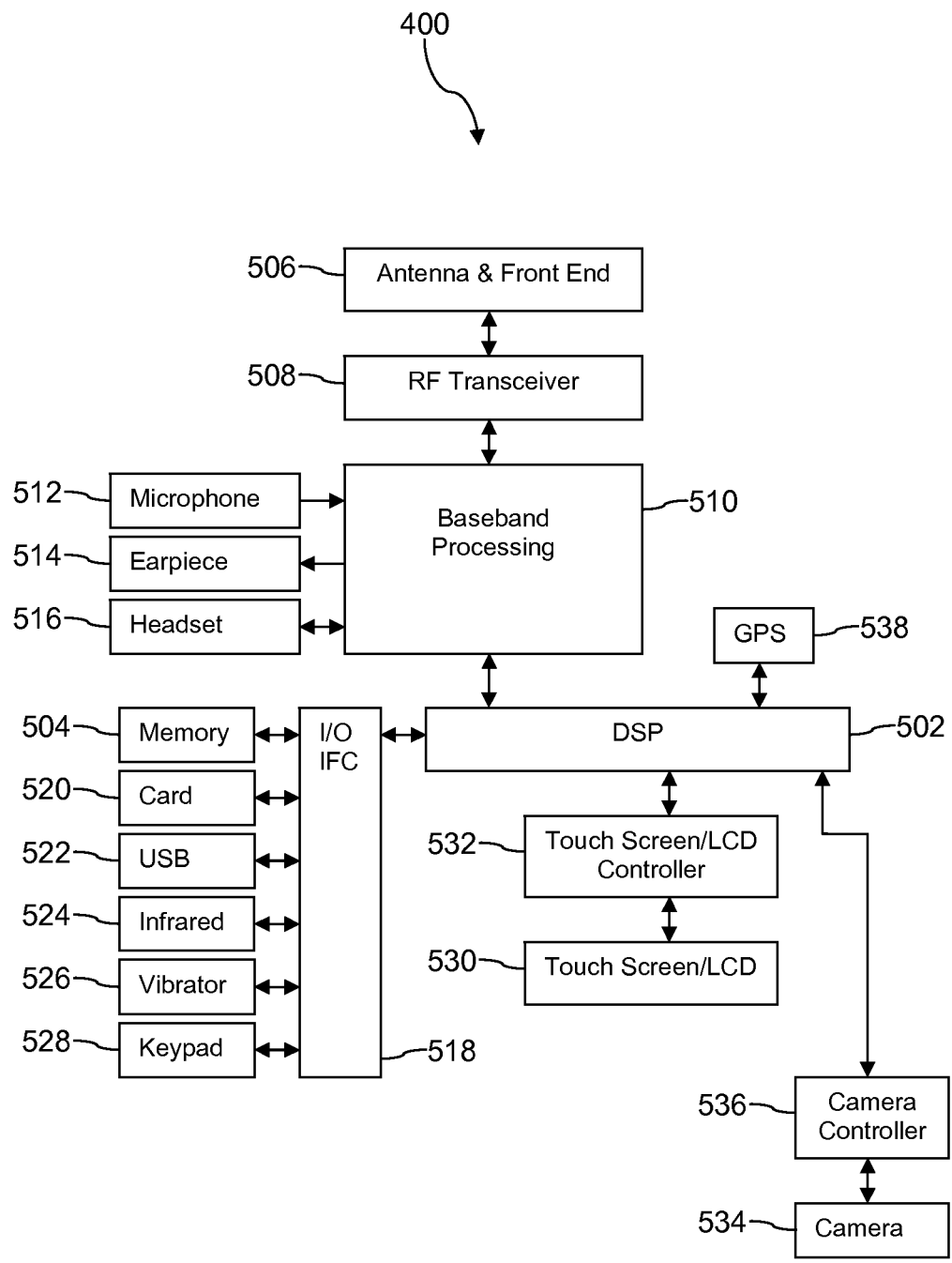
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Figure 6A:
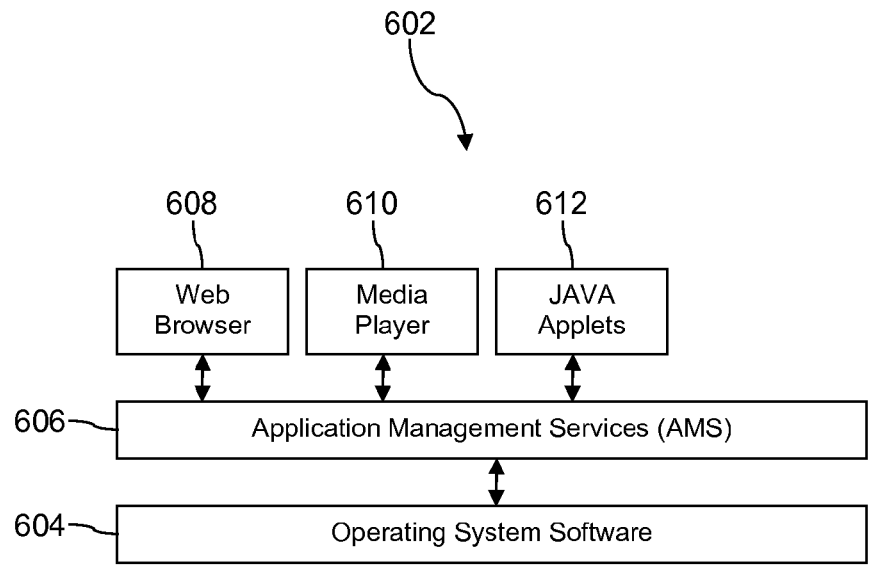
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
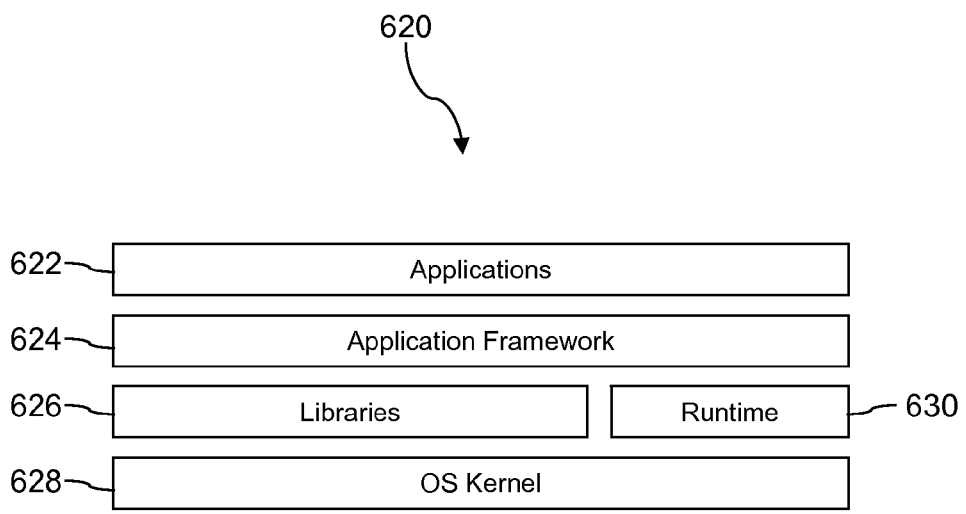
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
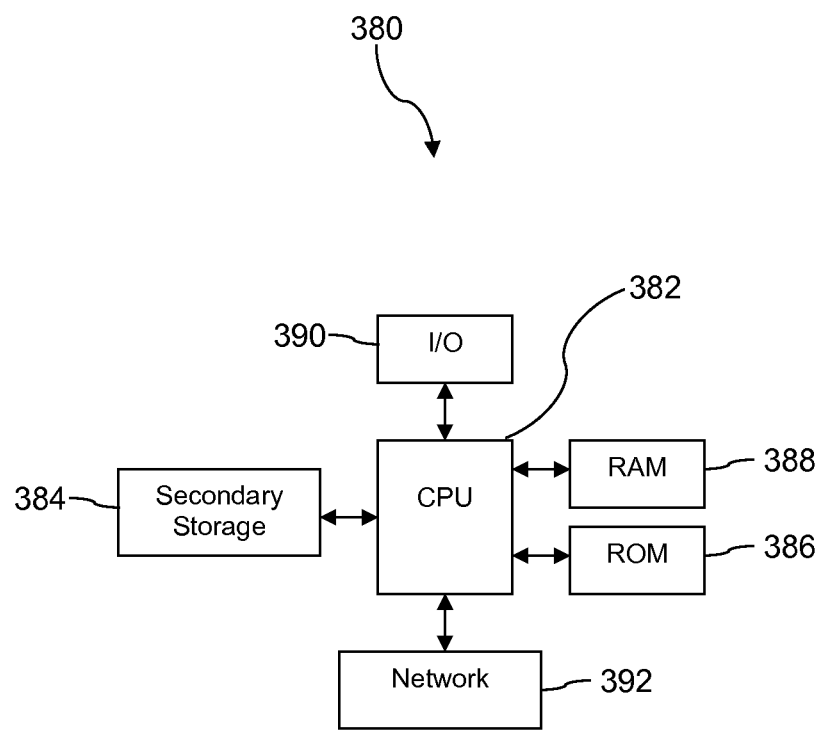
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
a processor; and
a memory, comprising:
   a permissive portion, comprising:
      an open mobile alliance (OMA) device management (DM) client application to provision the mobile communication device based on a state of a toggle key, and a trusted security zone portion, comprising:
- the toggle key, wherein the toggle key controls whether or not the profile of the mobile communication device is allowed to be provisioned into the mobile communication device, and wherein configurations of a network or an operating system associated with the network are provisioned during the profile provisioning, and
- a verification application, when executed by a trusted security zone portion of the processor:
  - examines an integrity of a preloaded OMA DM payload, wherein a security key in the OMA DM payload is compared with a security key stored in the trusted security zone to determine the integrity of the OMA DM payload and to determine a state of a preloaded first operating system from a first network,
  - verifies an identification of the mobile communication device,
  - transmits information comprising the security key in the trusted security zone to a server to verify network provisioning of the mobile communication device, and
  - changes the toggle key based on the verification results;

whereby asset migration between network carriers is achieved and unauthorized activities are avoided while security keys are kept confidential to individual carriers.

2. The mobile communication device of claim 1, wherein when the security key in the OMA DM payload matches to a security key from a plurality of security keys in the trusted security zone, the OMA DM payload is determined to be free from unauthorized provisioning.

3. The mobile communication device of claim 1, wherein 16 key slots are available in the trusted security zone to store 16 keys that can be used to verify the integrity of 16 instances of networks, 16 operating systems, or any combination of them.

4. The mobile communication device of claim 1, wherein the verification application performs a verification process that comprises a root detection process, and wherein a root detection process determines whether or not a device has been provisioned without authorization.

5. The mobile communication device of claim 4, wherein a triggering event for the verification process is one of a hands-free activation (HFA) device profile reset, a complete factory reset, new network start up, or an OMA DM profile change.

6. The mobile communication device of claim 5, wherein the verification application is monitoring the mobile communication device for triggering events.

7. The mobile communication device of claim 5, wherein the OMA DM client application sends a notification to the verification application when a triggering event occurs.

8. The method of claim 1, wherein a second security key for a second network is deposited in the trusted security zone if the mobile communication device is determined to be free from unauthorized manipulation, wherein the second security key is associated with a second trust enablement.

9. A method of provisioning a mobile communication device during initial activation, comprising:
- verifying an identification of the mobile communication device by the mobile communication device;
- transmitting information comprising a security key copied from a trusted security zone of a memory of the mobile communication device and an equipment serial number of the mobile communication device to a server with a server trusted security zone to verify network provisioning and identification of the mobile communication device;
- when the mobile communication device is determined by the server to be free from unauthorized provisioning, provisioning the mobile communication device by an open mobile alliance (OMA) device management (DM) client application on the mobile communication device; and
- when the mobile communication device is determined by the server to have been provisioned by an unauthorized source, preventing the mobile communication device from being activated;
- whereby unauthorized devices are prevented from utilizing a network.

10. The method of claim 9, wherein if the mobile communication device is verified to be free from unauthorized provisioning, the mobile communication device is provisioned with network settings and service settings through the open mobile alliance (OMA) device management (DM) client application with content transmitted from the network.

11. The method of claim 9, wherein 16 different networks can be provisioned to the mobile communication device with 16 distinct security keys, each at a time.

12. The method of claim 9, wherein up to 16 operating systems can be provisioned to the mobile communication device with 16 distinct security keys, each at a time.

13. The method of claim 9, wherein when a user of the mobile communication device decides to terminate service with the network and the security key is matched at the network, the mobile communication device is removed from a network access permission list.

14. The method of claim 9, wherein the mobile communication device is one of a mobile phone, a personal digital assistant, a wireless enabled computer, a media player, a laptop computer, a notebook computer, or a tablet computer.

15. The method of claim 9, wherein the mobile communication device establishes a wireless communication with a radio access network according to a code division multiple access (CDMA) wireless communication protocol, a global system for mobile communication (GSM) wireless communication protocol, a long-term evolution (LTE) wireless communication protocol, or a world-wide interoperability for microwave access (WiMAX) wireless communication protocol.

16. A method of provisioning a mobile communication device triggered by initial activation with a mobile device activation server with a server trusted security zone, comprising:
- verifying an identification of the mobile communication device by the mobile communication device;
- transmitting information comprising a security key stored in a trusted security zone of a memory of the mobile communication device and an equipment serial number to the mobile device activation server;
- forwarding, by the mobile device activation server, the security key and the equipment serial number to a server at a communications service provider to verify network provisioning and identification of the mobile communication device respectively;
- when the mobile communication device is determined to be eligible for provisioning by the mobile device activation server, transmitting, by the mobile device activation server, provisioning information to the mobile communication device; and
- when the mobile communication device is determined to be ineligible for provisioning by the mobile device activation server, provisioning, by the mobile device activation server, limited network access to the mobile communication device compared to network access privilege provisioned to mobile communication devices that are eligible for provisioning by the mobile device activation server;

whereby secure and efficient access to a network of the mobile device activation server is promoted.

17. The method of claim 16, wherein the mobile device activation server is a common platform with a platform trusted security zone that communicates with various communications network providers and third parties for device integrity verification and asset migration between communications network providers and third parties.

18. The method of claim 17, wherein a common token is used by all network carriers to communicate with the common platform.

19. The method of claim 17, wherein an individual token is assigned to each network carrier to communicate with the common platform.

20. The method of claim 16, further comprising when the mobile communication device is verified to be free from unauthorized provisioning, provisioning the mobile communication device with network settings and service settings.

* * * * *